United States Patent
Matsuoka et al.

(10) Patent No.: US 8,994,240 B2
(45) Date of Patent: Mar. 31, 2015

(54) PERMANENT MAGNET TYPE ROTATING ELECTRICAL MACHINE

(75) Inventors: Yusuke Matsuoka, Mie (JP); Masakatsu Matsubara, Yokkaichi (JP); Wataru Ito, Mie (JP)

(73) Assignees: Kabushiki Kaisha Toshiba, Tokyo (JP); Toshiba Industrial Products Manufacturing Corporation, Mie (JP)

( * ) Notice: Subject to any disclaimer, the term of this patent is extended or adjusted under 35 U.S.C. 154(b) by 481 days.

(21) Appl. No.: 13/359,905

(22) Filed: Jan. 27, 2012

(65) Prior Publication Data

US 2012/0194026 A1 Aug. 2, 2012

(30) Foreign Application Priority Data

Feb. 2, 2011 (JP) ................................. 2011-020637

(51) Int. Cl.
*H02K 1/27* (2006.01)
*H02K 1/06* (2006.01)

(52) U.S. Cl.
CPC .......... *H02K 1/2766* (2013.01); *H02K 2213/03* (2013.01)
USPC ................................. 310/156.53; 310/156.45

(58) Field of Classification Search
USPC ........................................ 310/156.53, 156.56
See application file for complete search history.

(56) References Cited

U.S. PATENT DOCUMENTS

| 6,741,003 B2 * | 5/2004 | Naito et al. ............... 310/156.53 |
| 7,479,723 B2 * | 1/2009 | Dawsey et al. .......... 310/156.57 |
| 7,504,754 B2 * | 3/2009 | Jahns et al. ............... 310/156.53 |
| 7,518,278 B2 * | 4/2009 | Hsu .......................... 310/156.56 |
| 2010/0079026 A1 * | 4/2010 | Han et al. ................. 310/156.53 |
| 2010/0141076 A1 * | 6/2010 | Blissenbach et al. ..... 310/156.53 |
| 2011/0001382 A1 * | 1/2011 | Leonardi et al. ......... 310/156.53 |
| 2011/0198959 A1 * | 8/2011 | Vyas ........................ 310/156.21 |

FOREIGN PATENT DOCUMENTS

| CN | 101656133 A | 2/2010 |
| JP | 2000-270525 | 9/2000 |
| JP | 2007-252018 A | 9/2007 |
| JP | 2007-267593 A | 10/2007 |
| JP | 2007-274798 A | 10/2007 |
| JP | 2009-044860 A | 2/2009 |

OTHER PUBLICATIONS

Official Action issued in related Chinese Patent Application No. 201210022938.4 mailed Dec. 27, 2013, 9 pages (with translation).

* cited by examiner

*Primary Examiner* — Burton Mullins
(74) *Attorney, Agent, or Firm* — Baker Botts L.L.P.

(57) ABSTRACT

A permanent magnet type rotating electrical machine includes a rotor having a rotor core. Magnet holes circumferentially arranged at regular intervals in the rotor core include pairs of first magnet holes and pairs of second magnet holes. Each pair of first magnet holes are symmetric with respect to an imaginary line extending through a rotor core center. Each pair of second magnet holes are located on a radially inner side of the rotor core and are symmetric with respect to the imaginary line. Each pair of second magnet holes are located on an inner circumferential side of the paired first magnet holes with respect to a radial direction of the rotor core. A first magnet angle made by permanent magnets located in each pair of first magnet holes is larger than a second magnet angle made by permanent magnets located in each pair of second magnet holes.

2 Claims, 6 Drawing Sheets

PERMANENT MAGNET TYPE ROTATING ELECTRICAL MACHINE

CROSS-REFERENCE TO RELATED APPLICATIONS

This application is based upon and claims the benefit of priority from Japanese Patent Application No. 2011-020637 filed Feb. 2, 2011, the entire contents of which are incorporated herein by reference.

FIELD

Embodiments described herein relate to a permanent magnet type rotating electrical machine.

BACKGROUND

A permanent magnet type electrical machine of the reluctance torque type is known in which permanent magnets are embedded in a rotor. An increased variable speed range and high output power have been required of this type of permanent magnet electrical machine. In this regard, a saliency ratio needs to be increased in order that reluctance torque may effectively be utilized. The saliency ratio depends upon a d-axis inductance (Ld) that is a magnetic concavity through which magnetic flux has a difficulty in passing and a q-axis inductance (Lq) that is a magnetic convexity through which magnetic flux is easy to pass, under the condition that interlinkage flux is kept constant.

DETAILED DESCRIPTION

Figure 1:
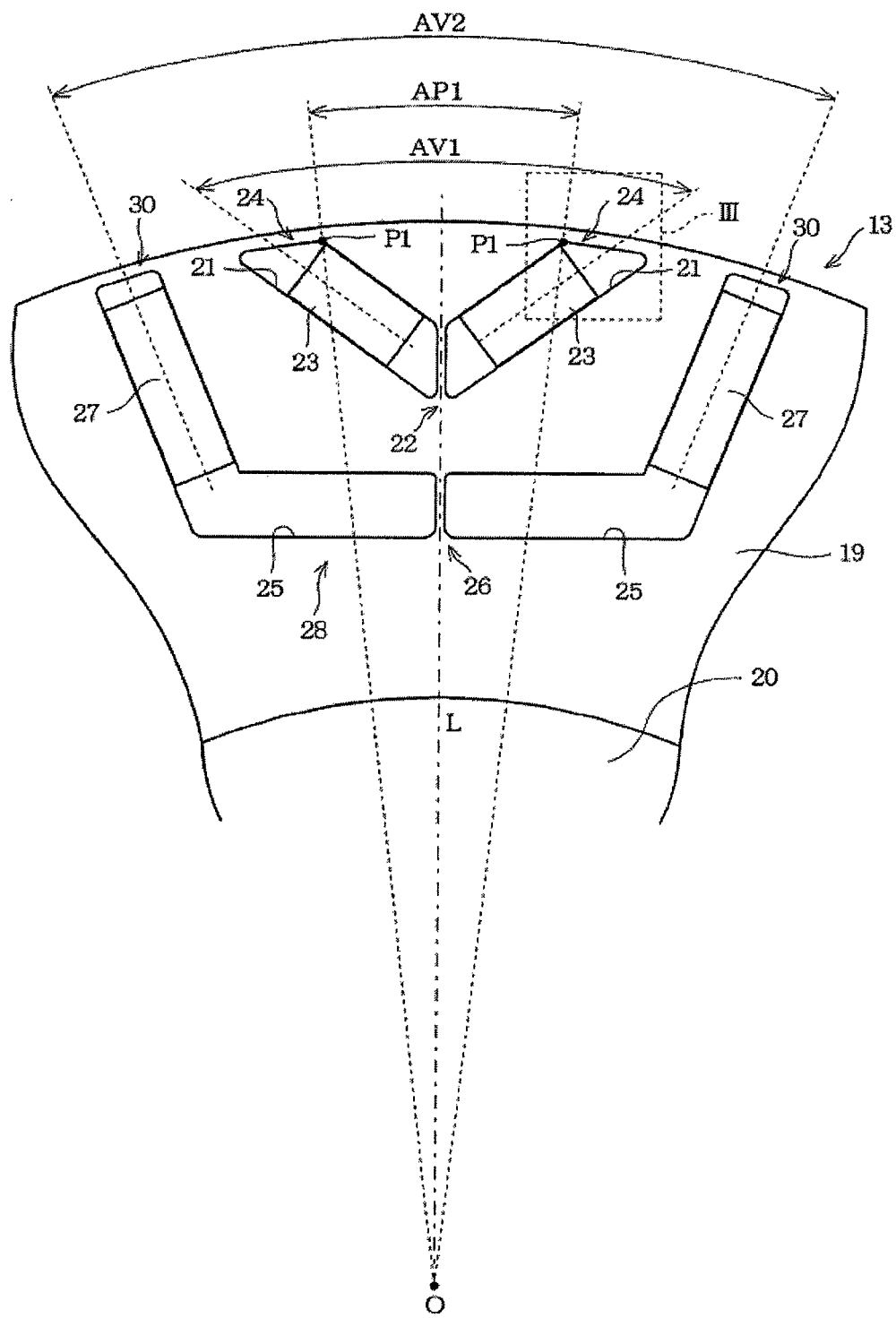
FIG. 1 is a schematic cross-sectional view of magnet holes of a permanent magnet type rotating electrical machine in accordance with a first exemplary embodiment, showing region 1 as shown in FIG. 2.

In general, according to one embodiment, a permanent magnet type rotating electrical machine includes a housing, a stator provided in the housing and having a stator core formed into a cylindrical shape and a stator coil provided on the stator core and a rotor provided at an inner circumferential side of the stator and having a rotor core formed into a cylindrical shape, permanent magnets provided in the rotor core and a rotating shaft member provided so as to be coaxial with the housing. The rotor core has a plurality of groups of magnet holes which are circumferentially arranged at regular intervals thereby to form magnetic barriers respectively. Each group includes a pair of first magnet holes which are symmetric with respect to an imaginary line extending through a center of the rotor core radially outward and a pair of second magnet holes which are located on a radially inner side of the rotor core than the corresponding pair of the first magnet holes and are symmetric with respect to the imaginary line. Each pair of first magnet holes are disposed so that a distance from each pair of the first magnet holes to the imaginary line is rendered longer as each pair of the first magnet holes come close to an outer circumference of the rotor core. Each pair of the second magnet holes are located on an inner circumferential side than the corresponding pair of the first magnet holes with respect to a radial direction of the rotor core. Each pair of the second magnet holes are disposed so that a distance from each pair of the second magnet holes to the imaginary line is rendered longer as each pair of the second magnet holes come close to the outer circumference of the rotor core. A first magnet angle made by the permanent magnets provided in each pair of the first magnet holes is larger than a second magnet angle made by the permanent magnets provided in each pair of the second magnet holes.

Each pair of the first magnet holes have respective ends that are located at an outer circumferential side of the rotor core and are formed along an outer circumferential edge of the rotor core, and first outer circumferential side bridge portions formed between the outer circumferential side ends of each pair of the first magnet holes respectively. A first pole angle ranges from 12.4° to 14.8° in an electrical angle where the first pole angle is made by lines between the center of the rotor core and first proximal points that are intersections of first circumferential imaginary lines obtained by circumferentially extending outer circumferential ends of each pair of the first magnet holes and first radial imaginary lines obtained by radially extending ends of each pair of first magnet holes, respectively. Each pair of the second magnet holes have ends that are located at an outer circumferential side of the rotor core and are formed substantially along an or the outer edge of the rotor core, and second outer circumferential side bridge portions formed between an or the outer edge of the rotor core and the outer circumferential side ends of each pair of the second magnet holes respectively. A second pole angle ranges from 29.2° to 30.8° in electrical angle where the second pole is made by lines between the center of the rotor core and second proximal points that are intersections of second circumferential imaginary lines obtained by circumferentially extending outer circumferential ends of each pair of the second magnet holes and second radial imaginary lines obtained by radially extending ends of each pair of the second magnet holes.

A permanent magnet type rotating electrical machine according to one embodiment will now be described with reference to the accompanying drawings. The permanent magnet type rotating electrical machine will hereinafter be referred to as "rotating electrical machine."

Figure 2:
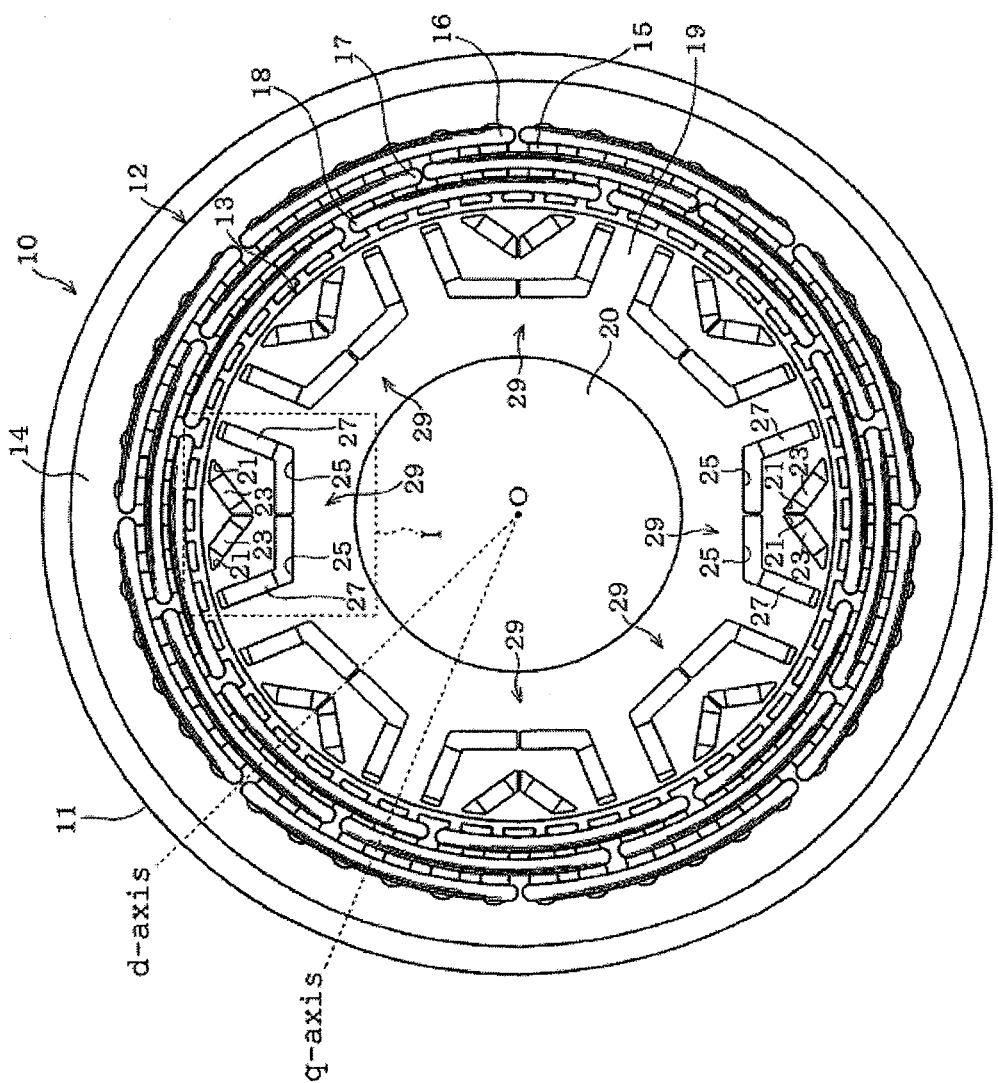
FIG. 2 is a schematic cross-sectional view of the rotating machine.

Referring to FIG. 2, the rotating electrical machine 10 according to the embodiment is shown and comprises a housing 11, a stator 12 housed in the housing 11 and a rotor 13. The stator 12 has a stator core 14 and phase U coils 16, phase V coils 17 and phase W coils 18 all serving as stator coils. The stator core 14 is formed into a cylindrical shape by stacking annular core strips each made of a magnetic steel sheet. The core strip is formed by punching a silicon steel sheet by a press machine. The stator core 14 has a plurality of coil insertion slots 15 located at an inner circumferential side thereof and extending in a stacking direction or in an axial direction. For example, 48 coil insertion slots 15 are formed throughout a circumferential area at the inner circumferential side of the stator core 14. The aforementioned phase U coils 16, phase V coils 17 and phase W coils 18 are inserted into the coil insertion slots 15 in a predetermined arrangement. Each stator coil has portions that are exposed at both axial ends of the stator core 14 thereby to be formed into coil ends, respectively. The stator configured as described above is mounted to the housing 11 using a jig (not shown).

The rotor 13 has a rotor core 19 and a rotating shaft member 20. The rotor 13 is provided in the inner circumferential space of the stator 12 with a slight gap being defined between an outer circumferential surface of the rotor core 19 and the inner circumferential surface of the stator 12. The rotor core 19 is formed by stacking disk-like core strips made of a magnetic steel plate. For example, the rotor core 19 is formed by punching a silicon steel plate by a press machine. The rotor core 19 has a multiple of pairs of first magnet holes 21, one of which pairs are shown in FIG. 1. Each pair of the first magnet holes 21 are symmetric with respect to an imaginary line L extending through a center O of the rotor core 19 radially outward, as shown in FIG. 1. The first magnet holes 21 constituting each pair have inner circumferential sides with respect to the rotor core 19 respectively. The inner circumferential sides of the first magnet holes 21 of each pair are adjacent to each other. Furthermore, distances from the first magnet holes 21 of each pair to the imaginary line L are rendered longer respectively as the first magnet holes 21 come close to an outer circumference of the rotor core 19. The first magnet holes 21 constituting each pair have ends or sides which are located at an inner circumferential side of the rotor core 19 and are opposed to each other with a gap therebetween. More specifically, the first magnet holes 21 constituting each pair are disposed so as to form a general V shape. Accordingly, the inner circumferential ends of the first magnet holes 21 constituting each pair form a first inner circumferential side bridge 22.

Permanent magnets 23 are accommodated in the first magnet holes 21 of each pair respectively. The permanent magnets 23 are made of, for example, a ferrite magnet, a rare-earth magnet containing a rare-earth element such as neodymium, or the like. The permanent magnets 23 accommodated in each pair of first magnet holes 21 have respective imaginary lengthwise center lines which make a first magnet angle AV1 therebetween as shown in FIG. 1. The permanent magnets 23 are disposed in a pair of first magnet holes 21 respectively so that the same pole portions, for example, north pole (pole N) portions of the permanent magnets 23 are located at the outer circumferential side of the rotor core 19. In this case, two permanent magnets 23 are disposed in another pair of first magnet holes 21 adjacent to the aforementioned pair so that south pole (pole S) portions of the permanent magnets 23 are located at the outer circumferential side of the rotor core 19, respectively. More specifically, the magnetic poles with different polarities are formed alternately in the circumferential direction of the rotor 13. Furthermore, each permanent magnet 23 is fixed and retained in the corresponding first magnet hole 21 by a convex portion (not shown) or the like provided in the first magnet hole 21 so as to be located at a predetermined position.

Figure 3:
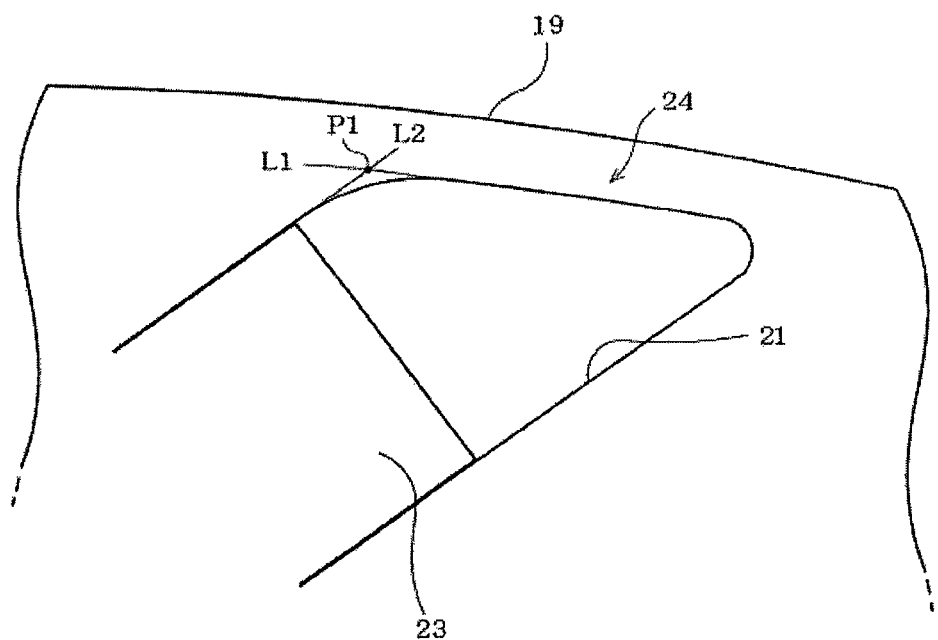
FIG. 3 is an enlarged view of region III in FIG. 1.

Furthermore, the first magnet holes 21 of each pair have respective outer circumferential side ends which are shaped so as to extend along an outer edge of the rotor core 19 near the outer edge. As a result, first outer circumferential bridges 24 are formed between the outer edge of the rotor core 19 and the first magnet holes 21 of each pair respectively. Now referring to FIG. 3, reference symbol "L1" designates a first imaginary circumferential line obtained by extending the outer circumferential end of each first magnet hole 21 circumferentially with respect to the rotor core 19. Reference symbol "L2" designates a first imaginary, generally radial line obtained by extending the end of each first magnet hole 21 at the imaginary line L side radially with respect to the rotor core 19. Reference symbol "P1" designates a first proximal point that corresponds to a point of intersection of the first circumferential imaginary line L1 with the first imaginary radial line L2. Reference symbol "AP1" designates a first pole angle made by lines connecting proximal points P1 and the center of rotor core 19, as shown in FIG. 1.

Furthermore, the rotor core 19 has a plurality of pairs of second magnet holes 25, each of which pairs are formed symmetrically with respect to the imaginary line L, as shown in FIG. 1. The second magnet holes 25 constituting each pair are located at the inner circumferential side than the corresponding pair of first magnet holes 21 so as to be proximate to each other. As a result, the second magnet holes 25 constituting each pair form a second inner circumferential side bridge portion 26 on the imaginary line L. Each second magnet hole 25 includes a circumferential portion extending substantially circumferentially from the second bridge portion 26 and a radial portion extending radially outward with respect to the rotor core 19. A distance from the radial portion of each second magnet hole 25 to the imaginary line L is gradually rendered longer as the radial portion approaches the outer circumference of the rotor core 19.

Permanent magnets 27 are accommodated in the second magnet holes 25 respectively. The permanent magnets 27 are made of, for example, a ferrite magnet, a rare-earth magnet containing a rare-earth element such as neodymium, or the like in the same manner as the permanent magnets 23. Furthermore, the permanent magnets 27 constituting each second pair are disposed in the respective second magnet holes 25 so that the same pole portions, for example, north pole portions of the permanent magnets 27 are located at the outer circumferential side of the rotor 13 in the same manner as the permanent magnets 23. Furthermore, the paired second magnet holes 25 adjacent to the aforementioned pair have respective permanent magnets 27 which are each disposed so that south pole portions are located at the outer circumferential side of the rotor core 19. Furthermore, the permanent magnets 27 are inserted only in the radial portions of the paired second magnet holes 25 respectively. Thus, the second magnet holes 25 constituting each pair include respective voids in which no permanent magnets 27 are accommodated. The voids of each pair of second magnet holes 25 are located at the inner circumferential side of the corresponding first magnet holes 21 respectively. A second magnet angle AV2 designates an angle made by lengthwise center lines of the paired permanent magnets 27 as shown in FIG. 1. The permanent magnet 27 is fixed in each second magnet hole 25 by a limiting portion comprising a convex portion (not shown) or the like provided in each second magnet hole 25 so as to be located at a predetermined position in the same manner as the permanent magnet 23.

The aforementioned bridge portions 22, 24 and 26 each have enough strength not to be broken by a centrifugal force acting on the permanent magnets 23 and 27 with rotation of the rotor 13. Furthermore, each bridge portion is formed so as to be as narrow as possible to the extent permitted by the strength as a countermeasure against leakage flux.

For example, eight pairs of the first magnet holes 21 and eight pairs of the second magnet holes 25 are arranged circumferentially at regular intervals in the rotor core 19 as shown in FIG. 2. Each one pair of the first magnet holes 21 and each one pair of the second magnet holes 25 serve as a group of magnets 29 forming a magnetic barrier 28. As a result, the rotating electrical machine 10 is provided with a d-axis that is a magnetic concavity through which magnetic fluxes have difficulty in passing and a q-axis that is a magnetic convexity through which magnetic fluxes easily pass.

The rotating shaft member 20 is located at a radial center of the rotor core 19. The rotating shaft member 20 is fixed to the rotor core 19 by press fitting, fitting, insertion or the like, for example. The rotating shaft member 20 has two ends between which is interposed the rotor core 19 and which are supported on respective bearing members so that the rotating shaft member 20 is rotatable. Ball bearings are employed as the bearings in the embodiment. An object to be driven (not shown) is connected to the rotating shaft member 20.

Drive signals are supplied from a drive circuit (not shown) to the stator coils of the rotating electrical machine 10 having the above-described construction. The drive signals are obtained by a three-phase PWM control in the embodiment. As a result, a turning force acts between the stator 12 and the rotor 13 such that the rotor 13 or the rotating shaft member 20 is rotated about a rotation axis, whereupon the object is rotated. More specifically, the rotating electrical machine 10 is an interior permanent magnet (IPM) motor in which the permanent magnets 23 and 27 are embedded in the rotor core 19.

The rotating electrical machine 10 has a high magnetic resistance on the d-axis and a low magnetic resistance on the q-axis. This change in the magnetic resistance develops torque. A saliency ratio between the d-axis inductance Ld and the q-axis inductance Lq needs to be increased in order that reluctance torque may effectively be used, as described above.

For the above-described purpose, the rotor core is formed with the first and second magnet holes 21 and 25 in which the permanent magnets 23 and 27 are disposed respectively in the rotating electrical machine 10. Furthermore, the first magnet angle AV1 is rendered larger than the second magnet angle AV2. The d-axis inductance Ld becomes small since the first magnet holes 21 are located on the d-axes corresponding to the direction of magnetic flux. On the other hand, the q-axis inductance Lq becomes larger relative to the d-axis inductance when the interlinkage flux is constant. More specifically, the saliency ratio between the d-axis inductance Ld and the q-axis inductance Lq is increased when the first magnet angle AV1 is increased. Consequently, the reluctance torque can effectively be used, whereby the characteristics of the rotating electrical machine 10 can be improved.

Furthermore, since the permanent magnets 23 and 27 are arranged in two layers such that the reluctance torque is improved, an amount of magnet need not be increased. More specifically, the rotating electrical machine 10 can improve the torque performance without increase in size thereof. In other words, the improvement in the torque performance can be rendered compatible with size reduction of the rotating electrical machine 10.

Furthermore, the permanent magnets 23 are disposed closer to the outer circumferential side or the surface side of the rotor core 13 when the first magnet angle AV1 is increased. A magnet torque is increased as the permanent magnets 23 are located near the outer circumferential side of rotor core 19, whereupon the magnet torque is increased in the rotating electrical machine 10. This can improve the characteristics of the rotating electrical machine 10. In this case, a total amount of permanent magnets 23 and 25 embedded in the first and second magnet holes 21 and 27 respectively can be equalized to that in general rotating electrical machines each having a single layer arrangement. As a result, the magnet torque can be used without reduction in an amount of magnetic flux, increase in the weight of the rotating electrical machine and the like.

Furthermore, the first magnet angle AV1 is made by the paired permanent magnets 23 composing the first layer or located at the outer circumferential side. The second magnet angle AV2 is made by the paired permanent magnets 27 composing the second layer or located at the inner circumferential side. The first and second magnet angles AV1 and AV2 are set so that the first magnet angle AV1 is larger than the second magnet angle AV2. As a result, the void of each second magnet hole 25 can be covered by a smaller amount of permanent magnet 23. Accordingly, a reduction in the weight of the rotating electrical machine 10 and accordingly a cost reduction can be achieved as compared with the case where the first and second magnet holes 21 and 25 are formed so as to be similar to each other.

The inventors conducted a research on the first and second magnet holes 21 and 25 thereby to find that there was a correlation between the positions of the first and second magnet holes 21 and 25 and the torque. More specifically, the inventors found that a torque reduction was able to be suppressed when the first magnet angle AV1 had been set in a suitable range. Torque measurement in this case used a known calculation formula including a d-axis current, d-axis inductance, q-axis current and q-axis inductance.

Figure 4:
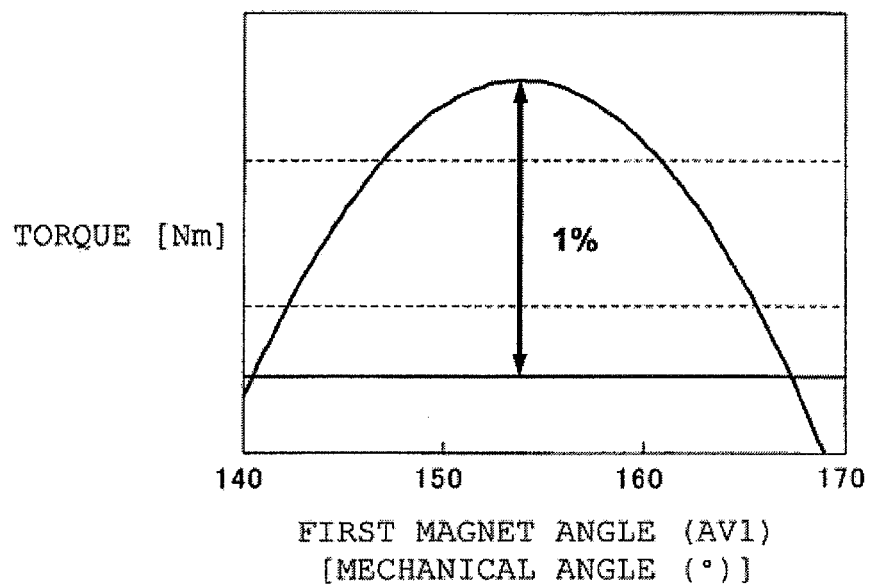
FIG. 4 is a graph showing the relationship between a first magnet angle in mechanical angle and torque in the first embodiment.

FIG. 4 illustrates a correlation between torque and the first magnet angle AV1. More specifically, FIG. 4 illustrates torque changes in the case where the first magnet angle AV1 was changed from 140° to 170° in the mechanical angle. Torque shows a symmetrical distribution with respect to a substantially 154-degree position as a peak position in the mechanical angle. It can be understood that torque is rapidly reduced as the first magnet angle AV1 departs from the 154-degree position. In order that the torque performance may be improved, the first magnet angle AV1 is set to be within a predetermined range with the 154-degree position being centered. In this case, the rotating electrical machine 10 does not result in a substantial torque reduction when the first magnet angle AV1 is set to be within a range substantially from 140° to 170° in the mechanical angle. Furthermore, it is more desirable that the first magnet angle AV1 be set to be within a range from 142° to 166° so that an amount of decrease from the peak position is less than 1%.

The inventors also found that there was a correlation between the position of each first magnet hole 25 and torque. More specifically, the inventors found that torque reduction was also able to be suppressed by setting the first pole angle AP1 in a predetermined range.

Figure 5:
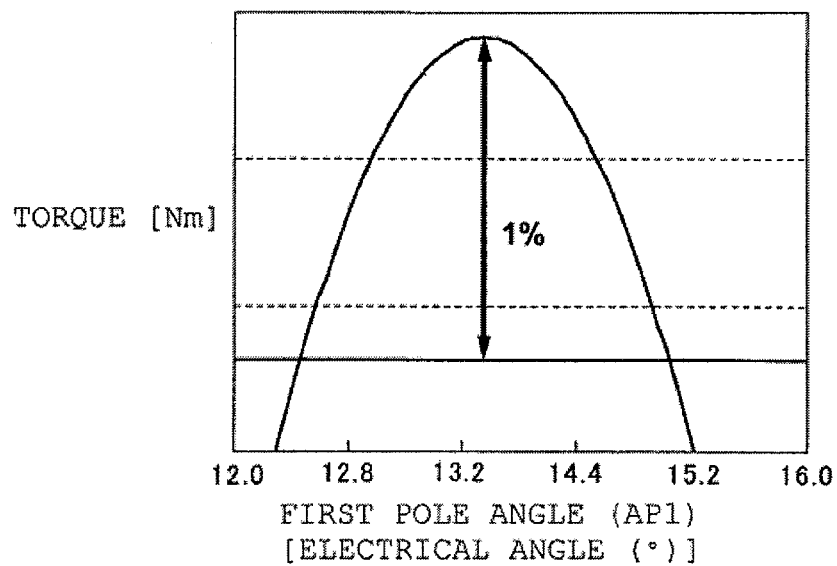
FIG. 5 is a graph showing the relationship between a first polar angle in electrical angle and torque in the first embodiment.

FIG. 5 illustrates the relation between torque and the first pole angle AP1, and more specifically, torque changes in the case where the first pole angle AP1 was changed from 12° to 16° in the electrical angle. Here, the electrical angle indicates an angle that is made by the north and south poles adjacent to each other and is represented using π [rad]. In this case, the electrical angle is p/2 times as large as the mechanical angle that is a physical angle, where p designates the number of poles of the rotating electrical machine. More specifically, in the case of the 8-pole rotating electrical machine as in the embodiment, the electrical angle is obtained from the expression, electrical angle=mechanical angle×8/2=4×mechanical angle. Torque is substantially symmetrically distributed with a substantially 13.6-degree position in the electrical angle as a peak position, as shown in FIG. 5. It can be understood that torque is rapidly reduced as the first pole angle AP1 departs from the 13.6-degree position as the peak position. In order that the torque performance may be improved, the first pole angle AP1 is set to be within a predetermined range with the 13.6-degree position being centered. In this case, the rotating electrical machine 10 does not result in a substantial torque reduction when the first pole angle AP1 is set to be within a range substantially from 12.2° to 15.2° in the electrical angle. Furthermore, it is more desirable that the first pole angle AP1 be set to be within a range from 12.4° to 14.8° so that an amount of decrease from the peak position is less than 1%.

Figure 6:
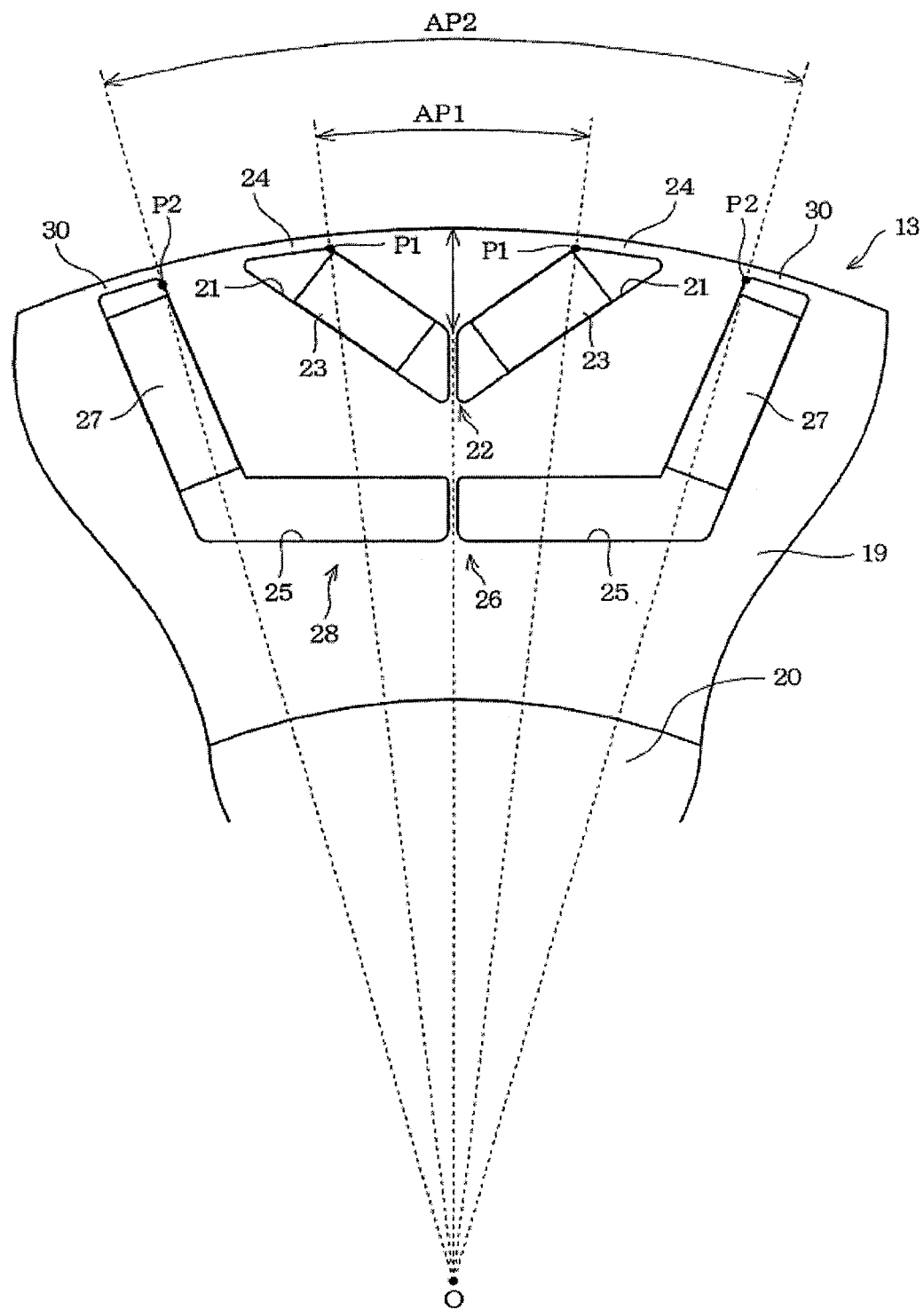
FIG. 6 is a partial cross-sectional view of the magnet holes, showing a second polar angle.

The inventors further found that there was a correlation between torque and the position of a part of each second magnet hole 25 extending radially outward with respect to the rotor core 19. Second outer circumferential side bridge portions 30 are formed between the second magnet holes 25 of each pair and the outer circumferential side end of the rotor core 19 respectively as shown in FIG. 1. In this case, second imaginary circumferential lines (not shown) are obtained by extending outer circumferential side ends of the second magnet holes 25 circumferentially with respect to the rotor core 19 respectively, based on the same manner as in obtaining the first proximal points P1, as shown in FIG. 6. Furthermore, second imaginary radial lines (not shown) are obtained by extending ends of the second magnet holes 25 located at the imaginary line L side radially with respect to the rotor core 19 respectively. Reference symbol "P2" designates second proximal points that are points of intersection of the second imaginary circumferential lines with the second imaginary axial lines. In this case, a second pole angle AP2 designates an angle made by lines connecting between the second proximal points P2 and the center O of the rotor core 19.

Figure 7:
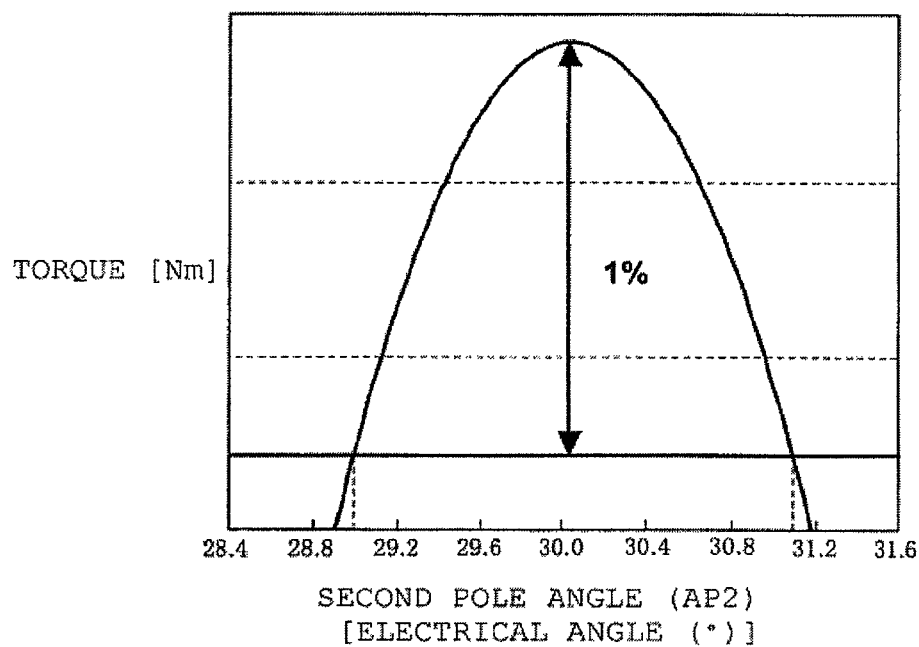
FIG. 7 is a graph showing the relationship between a second polar angle in electrical angle and torque in the first embodiment.

FIG. 7 illustrates the relationship between the second pole angle AP2 and torque and more specifically, torque changes in the case where the second pole angles AP2 are changed in a range from 28.8° to 31.2° in the electrical angle. As understood from FIG. 7, torque shows a symmetrical distribution with respect to a substantially 30.0-degree position as a peak position in the electrical angle. It can also be understood that torque is rapidly reduced as the second pole angle AP2 departs from the 30.0-degree position in the electrical angle. In order that the torque performance may be improved, the first pole angle AP1 is set to be within a predetermined range with the 30.0-degree position being centered. In this case, the rotating electrical machine 10 does not result in a substantial torque reduction when the second pole angle AP2 is set to be within a range substantially from 28.8° to 31.2° in the mechanical angle. It is more desirable that the second pole angle AP2 be set to be within a range from 29.2° to 30.8° in the electrical angle so that an amount of decrease from the peak position is less than 1%.

In the above-described rotating electrical machine 10, the torque reduction can be suppressed by setting the first magnet angle AV1 and the first and second pole angles AP1 and AP2, which results in suppression of deterioration in the characteristics of the rotating electrical machine 10.

Furthermore, the rotating electrical machine 10 has a reduced weight and a reduced size, thereby preventing reduction in vehicle mountability. Furthermore, since the rotating electrical machine 10 has an improved torque performance as described above, consumption of a drive power supply such as batteries can be reduced. In other words, the rotating electrical machine 10 can be mounted in electric-powered vehicles, hybrid vehicles and the like.

The rotating electrical machine 10 can be applied to uses other than vehicles as exemplified above. The number of poles and the number of coil phases should not be limited to those described above in the embodiment. For example, the rotating electrical machine 10 may be applied to a 4-pole or 12-pole rotating electrical machine. Additionally, the first and second magnet holes 21 and 25 may be provided with escape portions to prevent corners of the permanent magnets 23 and 27 from being broken, respectively.

As understood from the foregoing, the rotating electrical machine 10 includes the rotor core 19 having a plurality of groups of magnet holes 29 each of which groups includes the paired first magnet holes 21 and the paired second magnet holes 25. The first and second magnet holes 21 and 25 are arranged circumferentially with respect to the rotor core 19. Each magnet hole group serves as the magnetic barrier 28. The first magnet angle AV1 is made by the permanent magnets 23 disposed in each paired first magnet holes 21. The second magnet angle AV2 is made by the permanent magnets 27 disposed in each paired second magnet holes 25. The first magnet angle AV1 is set to be larger than the second magnet angle AV2, whereupon the saliency ratio between the d-axis and the q-axis is increased. This realizes effective use of reluctance torque, resulting in an improvement of torque performance. Thus, the rotating electrical machine 10 can achieve enlargement of a variable speed range and improvement of output power.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A permanent magnet type rotating electrical machine comprising:
    a housing;
    a stator provided in the housing and having a stator core formed into a cylindrical shape and a stator coil provided on the stator core; and
    a rotor provided at an inner circumferential side of the stator and having a rotor core formed into a cylindrical shape, permanent magnets provided in the rotor core and a rotating shaft member provided so as to be coaxial with the housing, wherein:
    the rotor core has a plurality of groups of magnet holes which are circumferentially arranged at regular intervals thereby to form magnetic barriers respectively;
    each group includes a pair of first magnet holes which are symmetric with respect to an imaginary line extending through a center of the rotor core radially outward and a pair of second magnet holes which are located on a radially inner side of the rotor core than the corresponding pair of the first magnet holes and are symmetric with respect to the imaginary line;
    each pair of first magnet holes are disposed so that a distance from each pair of the first magnet holes to the imaginary line is rendered longer as each pair of the first magnet holes come close to an outer circumference of the rotor core;
    each pair of the second magnet holes are located on an inner circumferential side than the corresponding pair of the first magnet holes with respect to a radial direction of the rotor core;
    each pair of the second magnet holes are disposed so that a distance from each pair of the second magnet holes to the imaginary line is rendered longer as each pair of the second magnet holes come close to the outer circumference of the rotor core;
    a first magnet angle made by the permanent magnets provided in each pair of the first magnet holes is larger than a second magnet angle made by the permanent magnets provided in each pair of the second magnet holes;

each pair of the first magnet holes having respective ends that are located at an outer circumferential side of the rotor core and are formed along an outer circumferential edge of the rotor core, and first outer circumferential side bridge portions formed between the outer circumferential edge of the rotor core and the outer circumferential side ends of each pair of the first magnet holes, respectively;

a first pole angle ranging from 12.4° to 14.8° in an electrical angle where the first pole angle is made by lines between the center of the rotor core and first proximal points that are intersections of first circumferential imaginary lines obtained by circumferentially extending outer circumferential ends of each pair of the first magnet holes and first radial imaginary lines obtained by radially extending ends of each pair of the first magnet holes, respectively;

each pair of the second magnet holes having ends that are located at an outer circumferential side of the rotor core and are formed substantially along the outer edge of the rotor core, and second outer circumferential side bridge portions formed between the outer edge of the rotor core and the outer circumferential side ends of each pair of the second magnet holes, respectively; and a second pole angle ranging from 29.2° to 30.8° in electrical angle where the second pole angle is made by lines between the center of the rotor core and second proximal points that are intersections of second circumferential imaginary lines obtained by circumferentially extending outer circumferential ends of each pair of the second magnet holes and second radial imaginary lines obtained by radially extending ends of each pair of the second magnet holes.

2. The machine according to claim 1, wherein the first magnet angle ranges from 142° to 166° in a mechanical angle.

* * * * *